No. 816,612. PATENTED APR. 3, 1906.
R. SIEGFRIED.
FLEXIBLE CONNECTION FOR GEARLESS MOTORS.
APPLICATION FILED DEC. 18, 1905.

2 SHEETS—SHEET 1.

WITNESSES:
C. L. Belcher
Otto S. Schairer

INVENTOR
Robert Siegfried
BY
ATTORNEY

UNITED STATES PATENT OFFICE.

ROBERT SIEGFRIED, OF PITTSBURG, PENNSYLVANIA, ASSIGNOR TO WESTINGHOUSE ELECTRIC & MANUFACTURING COMPANY, A CORPORATION OF PENNSYLVANIA.

FLEXIBLE CONNECTION FOR GEARLESS MOTORS.

No. 816,612.      Specification of Letters Patent.      Patented April 3, 1906.

Application filed December 18, 1905. Serial No. 292,226.

*To all whom it may concern:*

Be it known that I, ROBERT SIEGFRIED, a citizen of the United States, and a resident of Pittsburg, in the county of Allegheny and State of Pennsylvania, have invented a new and useful Improvement in Flexible Connections for Gearless Motors, of which the following is a specification.

My invention relates to means whereby electric motors and other prime movers may be connected to the driving-wheels of vehicles propelled thereby or to other devices; and it relates particularly to means for resiliently opposing relative endwise movement of the propelled and the propelling members.

The object of my invention is to provide novel, efficient, and durable means of the character above indicated.

Electric motors that are employed for the propulsion of locomotives and other vehicles are frequently mounted upon quills or sleeves that surround the driving-axles and are directly connected to the axles or driving-wheels, the motors which are so applied being generally adapted for slower speeds of operation than the more usual forms that are connected to the driving-axles by means of speed-reducing gearing.

In each of two other applications, serially numbered 261,672 and 261,673, respectively, and filed May 22, 1905, I have set forth means whereby the quills upon which the motors are mounted may be resiliently connected to and supported by the driving-wheels and a cushioning-ring for opposing relative endwise movement of the motor and the driving-wheel. My present invention provides resilient coupling means between the quill and the driving-wheel which does not necessarily differ from what is shown in the one or the other of said prior applications, but it combines with the one or the other coupling, or with a functionally equivalent means, a more efficient and durable means for opposing and absorbing relative endwise movement of the quill and wheel, and it is my desire and intention to herein cover generically all substantially equivalent means for effecting this result.

Figure 1:
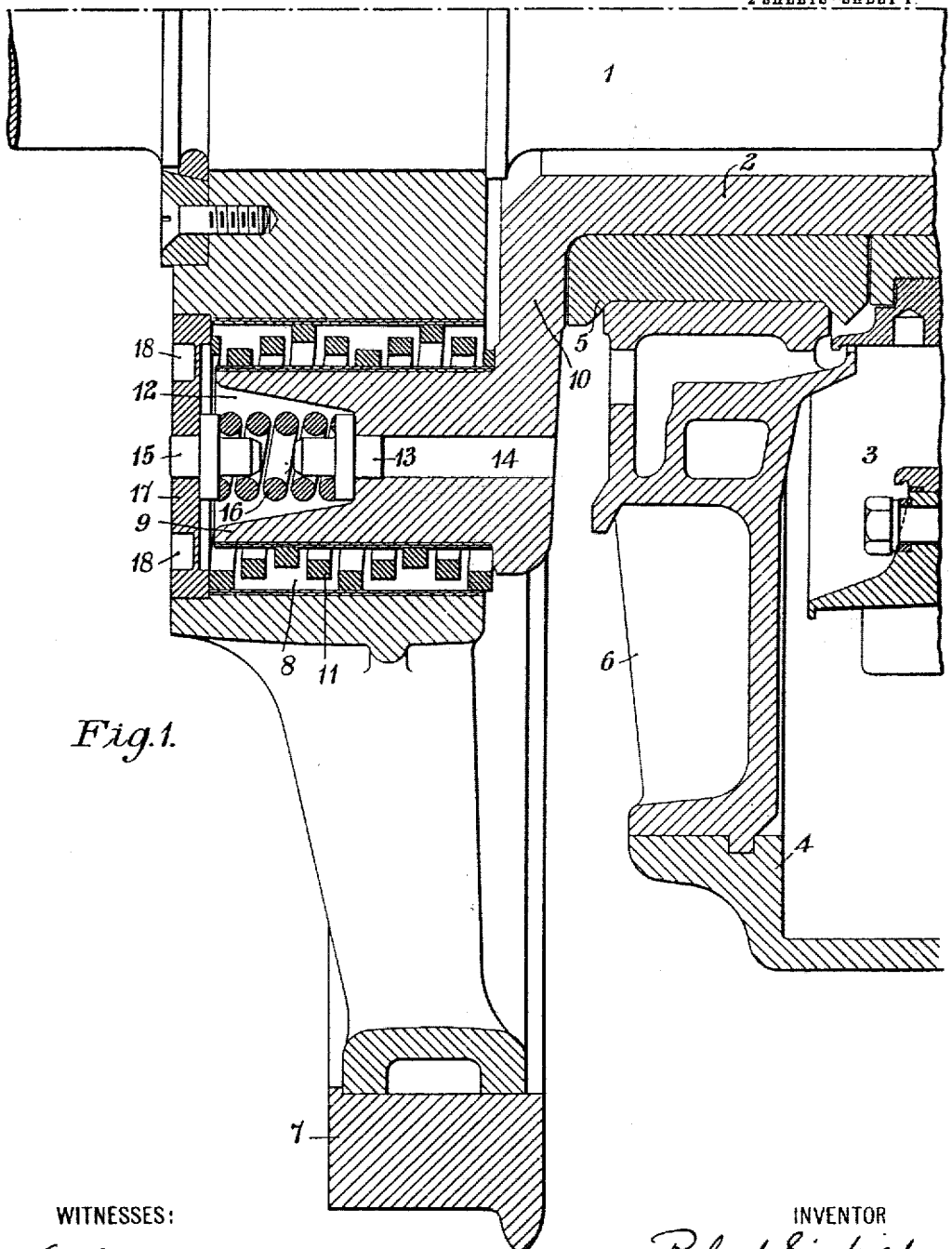
Figure 2:
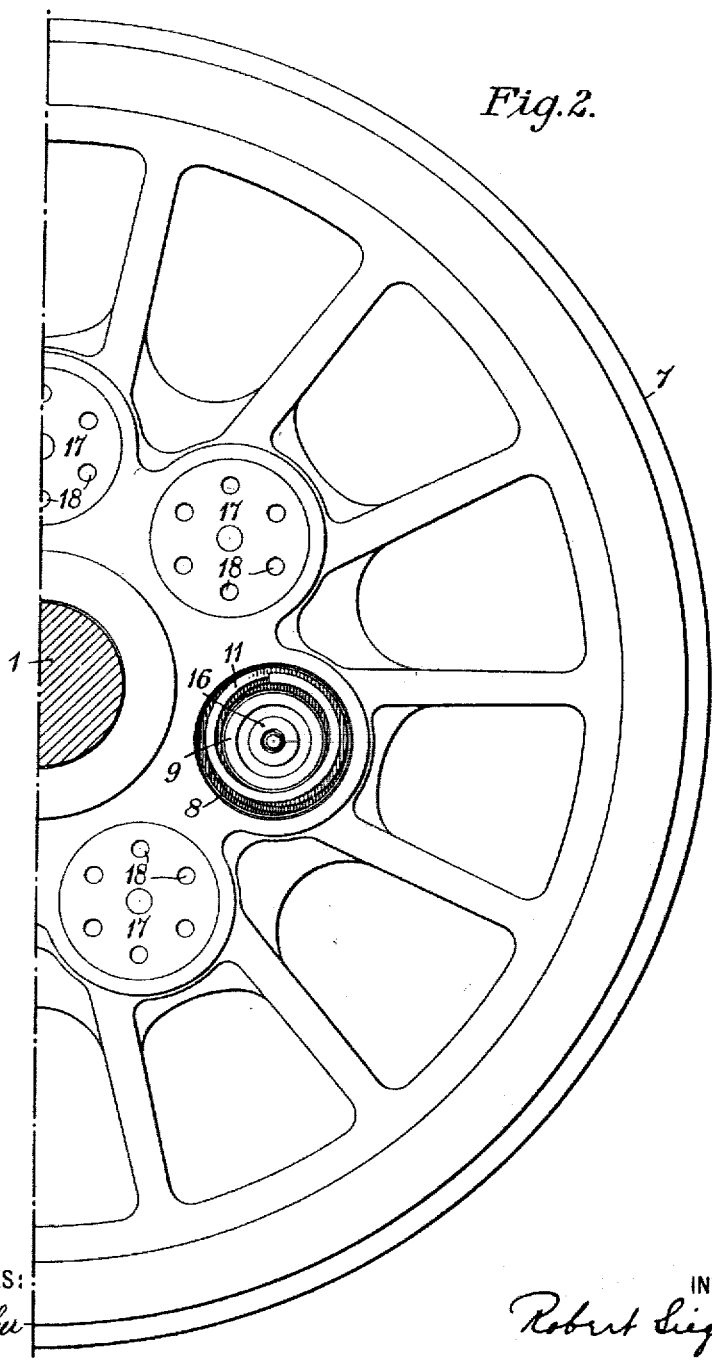

Figure 1 of the accompanying drawings is a view in section of a portion of an electric motor and means for mounting the same in accordance with my invention; and Fig. 2 is a view in end elevation of a portion of the vehicle-wheel that is shown in Fig. 1, one of the parts being removed for the sake of clearness of illustration.

An axle 1, that may be the driving-axle of a locomotive or other vehicle, is surrounded by a quill 2, to which a rotatable member or armature 3 of an electric motor is rigidly secured. The stationary member or field-magnet frame 4 of the motor is mounted upon the quill, so as to permit of rotation of the quill by means of a bearing 5, that is supported in an end bracket 6 of the frame.

A driving-wheel 7 is mounted upon the axle 1 and is provided with a set of annularly-disposed chambers 8, into which project a corresponding set of bosses 9 from radial arms 10 at the end of the quill 2. The bosses 9 may be surrounded by resilient and specially-formed helical springs 11, that severally comprise a plurality of convolutions, no two consecutive turns of which are concentric, as shown, described, and claimed in application Serial No. 261,673, or they may be surrounded by other suitable cushioning means, whereby the quill may be resiliently connected to and supported by the driving-wheel 7.

In the ends of the bosses 9 are recesses 12, from the bottoms of which the free ends of flanged pins 13 project, the pins being pressed or otherwise secured in drilled openings 14, that may extend axially through the bosses. A corresponding set of flanged pins 15 are secured in the end walls of the chambers 8, so that their free ends project toward the pins 13. A helical compression-spring 16 surrounds the free ends of the pins 13 and 15 and serves to relieve the other parts from all shocks resulting from relative axial motion between the quill and the wheel.

In order to permit of ready inspection and repair of the parts within the chambers 8, the outer ends of the chambers may be provided with screw-threaded plates 17, removal of which may be effected by means of a suitable wrench that may be inserted in openings 18 in the outer faces of the plates.

I claim as my invention—

1. The combination with an axle having a wheel provided with a set of chambers, a quill or sleeve surrounding the axle and provided with bosses that project into the chambers, and resilient cushioning means that surround the bosses within the chambers, of resilient cushioning means between the ends of the bosses and the wheel.

2. The combination with an axle having a wheel provided with a set of chambers, a quill or sleeve surrounding the axle and provided with bosses that project into the chambers, and resilient cushioning means that surround the bosses within the chambers, of helical springs located between the ends of the bosses and the wheel, whereby the energy of relative axial motion of the wheel and quill may be absorbed.

3. The combination with an axle and a wheel mounted thereon that is provided with a set of chambers, of a quill or sleeve that surrounds the axle and is provided with recessed bosses that project into the chambers, resilient cushioning means surrounding the bosses within the chambers, sets of corresponding, oppositely-disposed projections at the ends of the chambers and at the bottoms of the recesses, respectively, and resilient means located within the recesses and supported in position by means of the projections.

4. The combination with an axle, a wheel mounted thereon that is provided with a set of chambers, a quill or sleeve surrounding the axle, bosses that project therefrom into the chambers and are provided with recesses, and resilient cushioning means surrounding the bosses within the chambers, of sets of corresponding, oppositely-disposed projections at the ends of the chambers and at the bottoms of the recesses, respectively, and helical compression-springs that are located within the recesses and surround the projections.

5. The combination with an axle, a wheel mounted thereon that is provided with a set of chambers, a quill or sleeve surrounding the axle, bosses that project therefrom into the chambers and are provided with recesses, and resilient cushioning means surrounding the bosses within the chambers, of sets of corresponding, oppositely-disposed and removable projections at the inner ends of the chambers and at the bottoms of the recesses, respectively, and helical springs that are located within the recesses and surround the projections.

6. The combination with a member having a chamber, another member having a boss that projects into the chamber and is provided with an end recess, and a resilient cushioning means surrounding the boss within the chamber, of a resilient cushioning means between the two members that is located in the recess in the boss.

7. The combination with a member having a chamber, another member having a boss that projects into the chamber and is provided with an end recess, of corresponding, oppositely-disposed projections at the end of the chamber and at the bottom of the recess, respectively, and a resilient cushioning means between the members that is located within the recess and that is supported in position by means of the projections.

8. The combination with a member having a chamber, another member having a boss that projects into the chamber and is provided with an end recess, of corresponding, oppositely-disposed projections at the end of the chamber and at the bottom of the recess, respectively, and a helical spring that is located within the recess and surrounds the projections.

9. The combination with a member having a chamber, another member having a boss that projects into the chamber and is provided with a recess, of corresponding, oppositely-disposed and removable projections at the end of the chamber and at the bottom of the recess, respectively, and a helical spring that is located within the recess and surrounds the free ends of the projections.

10. The combination with a wheel and its axle, of a quill that loosely surrounds the axle, and cushioning means interposed between the end of the quill and the wheel.

11. The combination with a wheel and its axle, of a quill that loosely surrounds the axle, a dynamo-electric machine that is mounted thereon, resilient connections between the quill and the truck-wheel and cushioning means interposed between the end of the quill and the wheel.

12. The combination with a wheel and its axle, of a quill that loosely surrounds the axle, and means for absorbing the energy of relative longitudinal motion between the axle and the quill.

13. The combination with a wheel and its axle, of a quill that loosely surrounds the axle, a resilient coupling between the quill and the wheel, and resilient means for opposing relative endwise movement of the shaft and the quill.

14. The combination with a wheel and its axle, of a quill that loosely surrounds the axle, a multiple spring-coupling between the quill and the wheel and a spring cushioning means between the quill and the wheel to oppose relative endwise movement of said parts.

15. The combination with an axle, and a wheel therefor having chambers, of a quill having bosses that project into said chambers, springs surrounding said bosses, and spring cushioning means for opposing relative endwise movement of the quill and the wheel.

16. The combination with a member having a chamber that is open at one end, another member having a boss that projects into the chamber through the open end, and a resilient cushioning means surrounding the boss within the chamber, of resilient cushioning means between the end of the boss and the inner end of the chamber.

17. The combination with a rotatable member having a chamber that is open at one end, another rotatable member having a boss that projects into the chamber through its open end, and a resilient cushioning means that surrounds the boss within the chamber, of a resilient cushioning means between the end of the boss and the inner end of the chamber.

In testimony whereof I have hereunto subscribed my name this 15th day of December, 1905.

ROBERT SIEGFRIED.

Witnesses:
OTTO S. SCHAIRER,
BIRNEY HINES.